United States Patent [19]

Griffey

[11] Patent Number: 4,820,959

[45] Date of Patent: Apr. 11, 1989

[54] PROJECTION CRT PROTECTION CIRCUIT

[75] Inventor: Donald E. Griffey, Skokie, Ill.

[73] Assignee: Zenith Electronics Corporation, Glenview, Ill.

[21] Appl. No.: 223,040

[22] Filed: Jul. 22, 1988

[51] Int. Cl.[4] .............................................. H01J 29/52
[52] U.S. Cl. ..................................... 315/384; 315/381; 315/411; 358/60; 358/220
[58] Field of Search ....................... 315/411, 384, 381; 358/60, 190, 220

[56] References Cited

U.S. PATENT DOCUMENTS 4,723,167  2/1988  Griffey ................................ 315/381

Primary Examiner—Theodore M. Blum

[57] ABSTRACT

A projection cathode ray tube burn protection circuit includes a buffer transistor supplied with a 60 Hz square wave signal from an optical coupler. A PNP and NPN combination of transistors full wave rectifiers the buffer output. The rectified signal is divided down to reduce the magnitude of the alternating current components therein and applied to the base of a switch transistor that is normally maintained in saturation for swamping out the alternating current components. The switch transistor drives a high voltage shut down transistor and a blank transistor for shutting down the high voltage generating system and for blanking the cathode ray tube, respectively, in the event the power input to the optical coupler is disrupted.

5 Claims, 1 Drawing Sheet

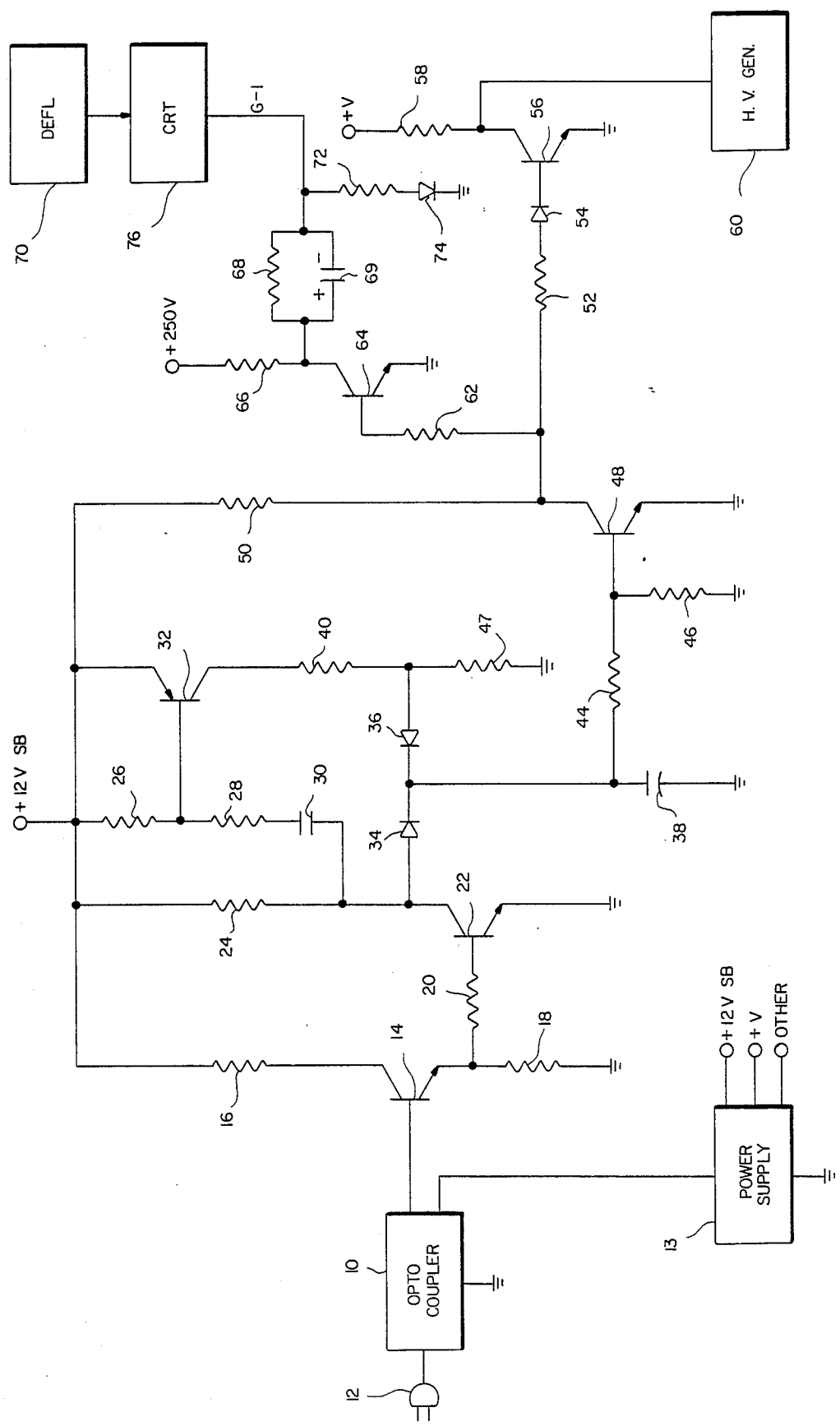

PROJECTION CRT PROTECTION CIRCUIT

BACKGROUND OF THE INVENTION

This invention relates generally to cathode ray tube (CRT) burn protection circuits and specifically to a burn protection circuit for use with a projection type CRT.

Burn protection circuits for CRTs are well known. They are designed to prevent the occurrence of a relatively stationary high energy electron beam impinging on the phosphor covered faceplate of the CRT. In color CRTs of the shadow mask variety, the shadow mask absorbs a substantial portion of the electron beam energy and burning of the CRT phosphor is not considered a severe problem. Monochrome CRTs and projection type CRTs, on the other hand, do not have shadow masks and there is an increased potential for dangerously high concentrations of beam energy on areas of the CRT. The problem is generally caused by the collapse of the CRT electron beam deflection system before the high voltage system has been shut down and its energy dissipated. The above situation can result in a relatively stationary high energy electron beam impacting a small, central area of a the CRT screen.

In many television and monitor applications, the deflection system and the high voltage generating system are interrelated, that is, the high voltage is developed by rectification of a so-called flyback pulse that is developed in the deflection system. Other systems have a deflection circuit that is independent of the high voltage generating circuit. In either system, current art prescribes a shutdown sequence for assuring that, under normal operating conditions, high voltage generation is disabled before the deflection circuit is disabled. In certain microprocessor based television receivers and projection systems, a special high voltage shutdown transistor may be actuated by a suitable signal to rapidly disable the high voltage generating system. Also, a separate so called "blank" transistor may be energized for driving the CRT into cutoff. Such systems are well known in the art.

The present invention is especially useful in a projection monitor that includes independent high voltage and deflection circuits, for preventing CRT phosphor burn conditions from arising when the AC line power is interrupted during monitor operation.

OBJECTS OF THE INVENTION

A primary object of the invention is to provide an improved projection CRT burn protection circuit.

Another object of the invention is to provide an improved projection monitor.

BRIEF DESCRIPTION OF THE DRAWING

These and other objects and advantages of the invention will be apparent upon reading the following description in conjunction with the drawing, the single FIGURE of which is a partial schematic diagram of a CRT burn protection circuit constructed in accordance with the invention.

DESCRIPTION OF THE PREFERRED EMBODIMENT

Referring to the single FIGURE of the drawing, an optical coupler 10 (opto coupler) is interposed between a conventional AC line plug 12 and a DC power supply 13. Optical coupler 10 is well known in the art and comprises a line isolation device that accepts a 60 Hz sinewave input voltage and produces a 60 Hz square wave output voltage. Power supply 13 delivers a plurality of output DC voltages for supplying various circuits in the monitor (not shown). An NPN transistor 14 has its base supplied with the square wave output of optical coupler 10 and includes a collector resistor 16 connected to a +12 volts SB (standby) source of power. Its emitter is connected through a resistor 18 to ground. Transistor 14 functions as a buffer and amplifies the 60 Hz square wave output from optical coupler 10. The emitter of transistor 14 is connected through a resistor 20 to the base of an NPN transistor 22 having a grounded emitter and a collector connected to +12V SB through a resistor 24. The collector of transistor 22 is connected to the anode of a first rectifier diode 34, the cathode which is connected to the junction of the cathode of a second rectifier diode 36 and a capacitor 38, the other terminal of which is connected to ground.

A PNP transistor 32 has its emitter connected to +12V SB and its collector is connected to a series connected pair of resistors 40 and 42 that are returned to ground. The junction of resistors 40 and 42 is coupled to the anode of second rectifier diode 36. The base of transistor 32 is connected to the junction of a pair of resistors 26 and 28 that are connected in series with a capacitor 30 and that combination, in turn, is connected in parallel with resistor 24. Transistors 22 and 32 and their associated circuit elements and diodes 34 and 36 function as a full wave rectifier for developing a DC potential across capacitor 38 from the 60 Hz square wave supplied to the base of transistor 22. Capacitor 38 is relatively small so as not to introduce a significant delay in operation of the circuit. A pair of resistors 44 and 46 are connected across capacitor 38 for reducing the magnitude of the potential applied to the base of transistor 48 which is connected to the junction of resistors 44 and 46. The emitter of transistor 48 is connected to ground and its collector is connected through a load resistor 50 to +12 V SB. The collector of transistor 48 in turn supplies two transistor circuits, one for shutting down the high voltage and the other for driving the CRT into cutoff.

A resistor 52 is connected in series with a diode 54 to the base of a shutdown transistor 56 having a grounded emitter and a collector that is to H.V. generator drive circuit 60. Transistor 56 is normally open, but becomes a closed switch when its base is driven on by transistor 48. The collector of transistor 48 is also connected through a resistor 62 to the base of a blank transistor 64 that has a grounded emitter and a collector that is connected to +250 Volts through a resistor 66. Its collector output voltage is supplied to a G-1 bias network consisting of a resistor 68 in parallel with a capacitor 69 that supplies G-1 of the CRT 76 (shown as block) and is returned to ground through a resistor 72 and a diode 74. A deflection block 70, which should be understood to include suitable well known circuitry for developing deflection voltages for cathode ray tube 76, is also used. Under normal conditions blank transistor 64 is non-conductive and bias for G-1 is established through resistors 66, 68 and 72 and conductive diode 74.

In operation, optical coupler 10 supplies a train of 60 Hz square wave pulses to the base of transistor 14 driving it in out of conduction. The 60 Hz square wave pulse train is biased positively and has a negative peak of 0 volts and a positive peak of approximately 4 volts.

Transistor 22 is driven conductive by the positive portions of the square wave and transistor 32 is driven conductive when transistor 22 conducts. Diodes 34 and 36 are alternately driven conductive and a DC potential with a small amount of alternating current component is developed across capacitor 38. Transistor 48 is in saturation and effectively swamps out the alternating current components applied to its base. To further assist this swamping action, the signal is divided down in magnitude by resistors 44 and 46. It is important that transistor 48 remain in saturation under normal operating conditions since, if it does come out of saturation, its collector voltage will rise and turn on the shutdown transistor 56 and the blank transistor 64. It would be highly objectionable for transistor 48 to respond to the alternating current components in the rectified signal supplied to capacitor 38 and energize the blank transistor or shutdown the high voltage generation circuit. On the other hand, transistor 48 must be capable of switching very rapidly in the event of a fault condition occurring. A design compromise is therefore required in the degree of saturation that is permitted. The concomitant requirements of high switching speed and immunity to the alternating current component in the DC signal need to be balanced in the circuit design.

As mentioned, when the collector of transistor 48 rises (transistor 48 comes out of saturation) high voltage shutdown transistor 56 is driven conductive to immediately shut down the high voltage generation circuit 60. Simultaneously, blank transistor 64 is driven conductive to ground its collector and the positive terminal of capacitor 69 which places a large negative cutoff voltage on G-1 of CRT 76. These latter circuits are also standard in the art.

Upon removal of plug 12 from the AC line or upon failure of the AC line for any reason, the output square wave voltage from optical coupler 10 immediately jumps to +4V DC. Transistor 14 conducts, as well as transistor 22. Capacitor 30 blocks transistor 32 base current (only DC is now present) thus cutting off transistor 32. No DC is developed across capacitor 38 and transistor 48 is cutoff. As the collector voltage of transistor 48 rises, high voltage shutdown transistor 56 and blank transistor 64 are rapidly driven conductive to disable the high voltage generation circuit and to blank the CRT. Thus the projection CRT is protected even though its deflection voltage also collapses since the applied high voltage is rapidly removed and the CRT beam is blanked. It will be appreciated by those skilled in the art that the invention does not require the blank transistor to be used since simply shutting down the high voltage system is generally sufficient for most applications, partly due to removal of G-2 bias on the CRT, which is derived from high voltage. This is accomplished by other means, not shown.

What is claimed is:

1. In a projection cathode ray tube system of the type including separating high voltage generating means, high voltage shut down means for disabling the high voltage generating means, and optical coupler means for developing pulses of energy at power line frequency, the improvement comprising:
   means responsive to the pulse output from the optical coupler means for quickly disabling the high voltage generating means in the event of interruption of AC input power to the optical coupler means for protecting the cathode ray tube from phosphor burn.

2. The circuit of claim 1 further including means for amplifying the energy pulses from the optical coupler means;
   rectifying means for developing a DC voltage from the energy pulses; and
   saturated transistor switching means for normally swamping out alternating current fluctuations in the output of the rectifying means.

3. The circuit of claim 2, further including video amplifier means and a blank transistor for cutting off said cathode ray tube; and
   means for energizing said blank transistor in response to said saturated transistor switching means.

4. The circuit of claim 3 wherein the rectifying means includes a PNP and an NPN transistor and further including a voltage divider for reducing the magnitude of the alternating current fluctuations supplied to the saturated transistor switching means.

5. A projection monitor including:
   a projection cathode ray tube;
   deflection means supplying deflection signals to said cathode ray tube;
   high voltage generating means supplying high voltage to said cathode ray tube;
   video amplifying means for supplying video signals to said cathode ray tube;
   optical coupler means for developing square wave output energy pulses at power line frequency;
   buffer transistor means coupled to said optical coupler means and being driven by said square wave pulses;
   rectifying means, including an NPN and a PNP transistor, for rectifying the signal output of said buffer transistor means;
   saturated transistor switch means coupled to said high voltage generating means and to said video amplifying means; and
   voltage divider means coupled between said rectifying means and said saturated transistor switch means, said saturated transistor switch means normally swamping out any alternating current components in the output of said rectifying means and being driven out of saturation in response to the loss of said square wave pulse signal from said optical coupler means for disabling said high voltage generating mean means and for driving said cathode ray tube into cutoff.

* * * * *